Dec. 23, 1941.  E. RUSCO  2,266,815
HAY LOADER
Filed Nov. 10, 1939
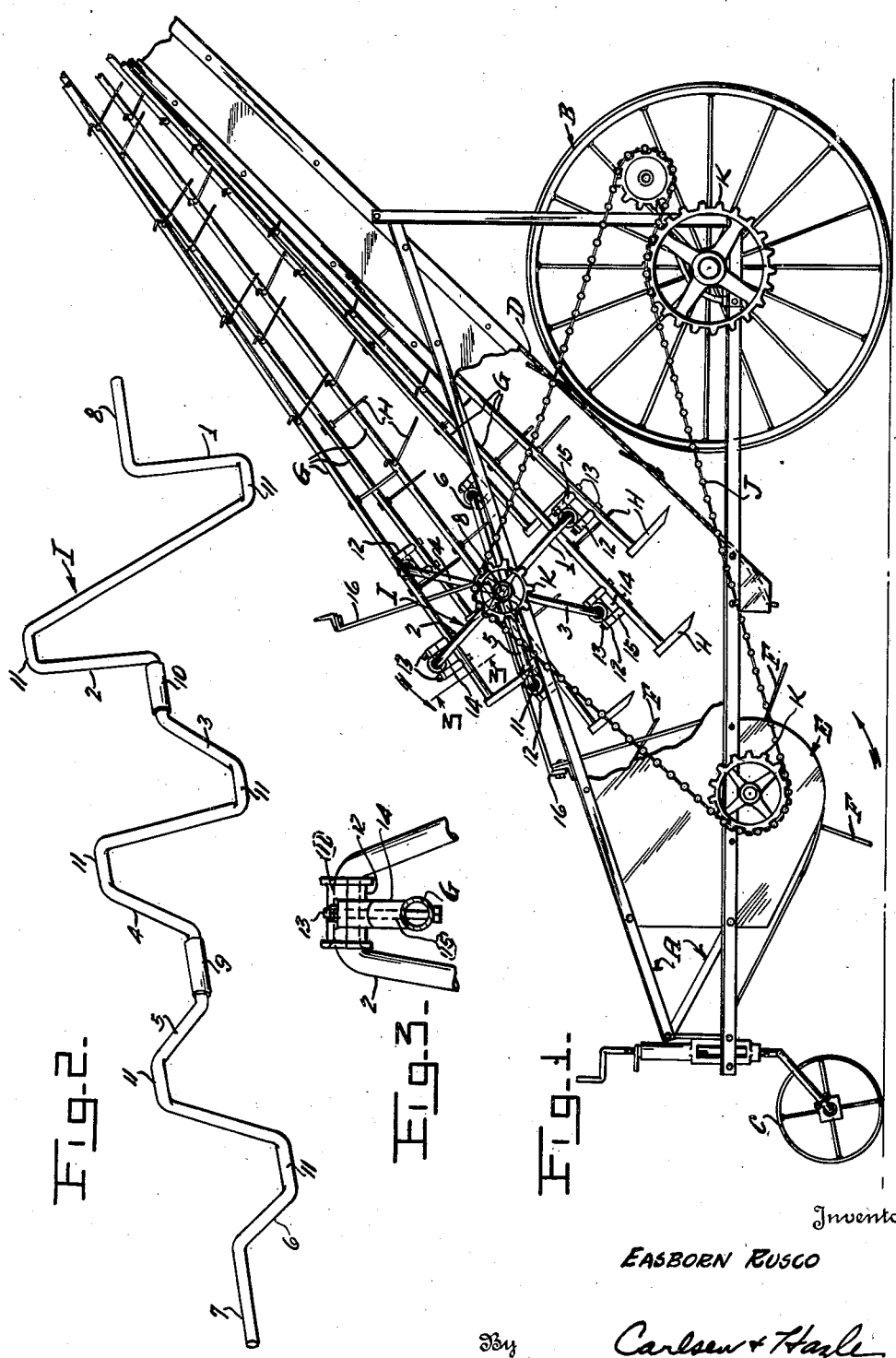
Inventor
EASBORN RUSCO
By Carlsen + Hazle
Attorneys Patented Dec. 23, 1941

2,266,815

UNITED STATES PATENT OFFICE 2,266,815

HAY LOADER

Easborn Rusco, Moline, Ill., assignor to Minneapolis-Moline Power Implement Company, Minneapolis, Minn., a corporation of Delaware Application November 10, 1939, Serial No. 303,836

3 Claims. (Cl. 198—223)

This invention relates to improvements in hay loaders, and the primary object is to provide a rake bare actuating means by which heavy green hay may be loaded with as much success as the lighter cured hay usually handled. Another object is to provide an improved crankshaft for actuating the rake bars of a hay loader in such manner that a far more even and better distributed action will be applied to the hay and so that shocks and jars on the driving mechanism will be reduced and the hay will be moved more rapidly and evenly over the loading deck. Another object is to provide improved means for varying the effective spacing between the rake bars and loading deck to thereby accommodate the loading action to either a large or small volume of hay and thereby adapt the machine to use on either green or cured hay.

These and other more detailed and specific objects will be disclosed in the course of the following specification, reference being had to the accompanying drawing, in which—

Fig. 1 is a fragmentary side elevation of the lower rear portion of a hay loader in which my improvements are incorporated, a section of one side panel being broken away to better show the crankshaft arrangement.

Fig. 2 is a perspective view of my improved rake bar crankshaft alone.

Fig. 3 is an enlarged fragmentary cross section along the line 3—3 in Fig. 1.

Referring now with more particularity to the drawing, the reference character A designates the main frame structure of a hay loader, and this frame is supported at its forward end by large ground wheels B and at its rear end by vertically adjustable caster wheels C. The frame carries the transversely extending and upwardly and forwardly inclined loading deck D, and, adjacent the lower edge of said deck a rotating cylinder mechanism E having rake teeth F which will pick up the cut hay from the field and carry it up over said lower deck edge. A plurality of rake bars G, having spaced teeth H turned toward the deck, are then provided and are actuated by a crankshaft I to have an oscillating and reciprocating motion by which they move forwardly and upwardly over the deck to carry the hay upwardly thereon and then at the limits of their working stroke are moved away from the deck and rearwardly to again reengage the hay. The hay is thus moved in a stream extending across the width of the deck and is finally delivered from its upper end to the wagon or rack (not shown) by which the loader is pulled.

Sprocket chains J at each side drive the cylinder E and crankshaft I from the ground wheels B by means of the sprockets K, as clearly shown.

The foregoing constitutes the essentially conventional structure for this type of loader. However, in all prior machines of which I am aware, it has been found that due to the crankshaft having its crank spaced not less than 120° apart, there has been a considerable variation in the load as the rake bars intermittently strike the hay and the strain on the operating mechanism has accordingly been great. In fact, when the hay is thick or heavy, it has been a common occurrence for the jarring strains to cause breakage of some parts, with an ensuing expense and loss of time for replacement.

Furthermore, it follows that in a machine using cranks spaced either 120° or 180° apart, there will be several short periods during each complete rotation where none of the rake bars will be effectively engaged with the hay, and such heavy green hay as soy beans or legumes, will thus have a decided tendency to slide back on the deck, hindering the loading and sometimes causing clogging.

Having in mind the foregoing facts, I have provided a crankshaft having six cranks or arms designated in the drawing by the numerals 1, 2, 3, 4, 5, and 6, all of which extend radially from the center axis of rotation at which the end journals 7 and 8 and center journals 9 and 10 are formed. The crank pins, designated throughout at 11, of these six cranks, are connected to the rake bars G by bearings 12, as will be hereinafter described in detail, and of course in such manner that the crankshaft, when rotated by the chain J over the sprockets K secured to the end journals 7 and 8, will oscillate and reciprocate the rake bars in the desired manner.

It will be noted that the six cranks 1 through 6 are equally spaced 60° apart around the axis of the crankshaft, and as a result at least two of the rake bars will be in effective (although not the same) working engagement with the hay at all times, and at times there will be three bars in working positions, as shown in Fig. 1. The hay will thus quite obviously be more effectively and rapidly moved over the deck and there will be no tendency for the hay to slide back as has heretofore been the case. Furthermore, there will be a far more even load transmitted to the operating mechanism, eliminating the tendency toward breakage of parts.

An extremely important feature of my crank arrangement, in addition to the 60° spacing, lies in the relative angular positions of the cranks. Thus the cranks of each pair 1—2, 3—4, and 5—6 are diametrically opposed or oppositely extended, but each pair of cranks is arranged at angles of 60° with respect to adjacent pairs.

The rake bars connected to the cranks are thus disposed so that no two will move in unison to working positions and so that, starting from either end of the crankshaft, the first, third, fifth second, fourth, and sixth bars will engage the hay in that order during each rotation of the shaft. The effective rack bars at any time are thus seen to be substantially spaced apart across the width of the loading deck so that the entire sheet or stream of hay will be evenly moved forward without any tendency to slide back at one side, as would be the case if the cranks were arranged to engage in successive order.

From the foregoing it will be apparent that the action will be constant and steady due to the continuous engagement of a part of the rake bars with the crop, and the mechanism will be freed of the troublesome shocks and jars of intermittent operation. The continuous working engagement, supplemented by the transverse spacing between the working bars at all times also greatly facilitates the handling of the heavier crops such as soy beans and hay cut in the green state for making silage or dehydrating. A single machine will thus met all crop conditions which may be encountered.

In line with this objective of providing a machine more effectively meeting the problems of variations in crop nature and weight, I provide the bearings 12, which are of the usual parted type secured together around the crank pins 11 by bolts 13 extended through the rake bars G, with removable filler blocks 14. These blocks are placed between the bearings and rake bars, and are retained in place by the bolts 13 which pass through the apertured ends 15 of the blocks. When so mounted the rake bars are spaced from the axis of the crank shaft so that they move relatively close to the loading deck D on their working stroke, and thus have maximum working effect on the hay. This is the adjustment used for handling green hay, where the volume is usually small and the hay thin upon the deck. When, however, a light cured hay is handled its volume is usually greater and the blocks 14 are then removed, moving the rake bars closer to the crank pins and increasing the spacing between the rake bars and deck. This adjustment may be carried out without in any way interfering with the operating parts or the effectiveness of the loading action of the bars.

The crankshaft is supported intermediate its ends by bearings of usual form (not shown) engaging the center journals 9 and 10 and supported by frame bars 16 rigidly connected to the loader frame A.

The fabrication of the crankshaft is furthermore greatly facilitated by the advantageous crank arrangement I provide. It will be seen that the pairs of opposed cranks 1—2, 3—4, and 5—6, lying in the same plane, may thus be readily formed individually and the three sections arranged in end to end relation and then welded or connected together at their ends at the journals 9 and 10, the proper angular relationship being adjusted during this operation.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a hay loader, a rake bar actuating crankshaft having a series of cranks so disposed that the first, third, fifth, second, fourth, and sixth cranks will carry the rake bars into crop engagement in that order.

2. The combination in a hay loader including six rake bars, of a crankshaft having six cranks connected to the rake bars for moving the same into crop working positions, the said cranks being disposed at angles of 60° about the axis of rotation and so arranged that the first, third, fifth, second, fourth and sixth rake bars, counted from one end, will be carried into crop working positions in that order and one at a time.

3. In a hay loader, a rake bar actuating crankshaft having six cranks disposed at angles of 60° about the axis of rotation, the said crankshaft being formed of three integral pairs of cranks arranged in end to end relation, and the meeting ends of the pairs being secured together at proper relative angles and at the axis of rotation to form center journals for the crankshaft.

EASBORN RUSCO.